United States Patent
Kim et al.

(10) Patent No.: US 9,618,674 B2
(45) Date of Patent: Apr. 11, 2017

(54) LIGHT GUIDE PANEL, BACK LIGHT ASSEMBLY AND DISPLAY APPARATUS EACH HAVING THE LIGHT GUIDE PANEL AND METHOD OF MANUFACTURING THE LIGHT GUIDE PANEL

(71) Applicant: SAMSUNG DISPLAY CO., LTD., Yongin, Gyeonggi-Do (KR)

(72) Inventors: Hyoung Joo Kim, Anyang-si (KR); Dong Yeon Kang, Seoul (KR); Rae Young Kim, Hwaseong-si (KR); Min Young Song, Asan-si (KR); Sung Kyu Shim, Seoul (KR); Sang Duk Lee, Asan-si (KR)

(73) Assignee: Samsung Display Co., Ltd. (KR)

( * ) Notice: Subject to any disclaimer, the term of this patent is extended or adjusted under 35 U.S.C. 154(b) by 234 days.

(21) Appl. No.: 14/164,543

(22) Filed: Jan. 27, 2014

(65) Prior Publication Data

US 2015/0092440 A1    Apr. 2, 2015

(30) Foreign Application Priority Data

Sep. 30, 2013 (KR) .......................... 10-2013-0116375

(51) Int. Cl.
*F21V 7/04* (2006.01)
*F21V 8/00* (2006.01)
*B29D 11/00* (2006.01)

(52) U.S. Cl.
CPC ...... *G02B 6/0016* (2013.01); *B29D 11/00663* (2013.01); *G02B 6/0036* (2013.01); *G02B 6/0065* (2013.01); *G02B 6/002* (2013.01); *G02B 6/0061* (2013.01)

(58) Field of Classification Search
CPC .. G02B 6/0016; G02B 6/0065; G02B 6/0036; G02B 6/002; G02B 6/0061; B29D 11/00663
USPC .......................................... 362/608; 264/1.24
See application file for complete search history.

(56) References Cited

U.S. PATENT DOCUMENTS

| 8,451,400 | B1 | 5/2013 | Hyung et al. | |
|---|---|---|---|---|
| 2004/0246698 | A1* | 12/2004 | Shimizu | G02B 6/0036 362/603 |
| 2009/0279324 | A1* | 11/2009 | Chen | G02B 6/0036 362/616 |
| 2010/0208496 | A1* | 8/2010 | Kim | B29D 11/00663 362/613 |
| 2011/0188830 | A1 | 8/2011 | Isago et al. | |
| 2011/0228556 | A1* | 9/2011 | Wang | G02B 6/0036 362/606 |
| 2012/0081637 | A1* | 4/2012 | Su | G02B 6/0036 349/65 |
| 2013/0141669 | A1 | 6/2013 | Shinohara et al. | |

(Continued)

FOREIGN PATENT DOCUMENTS

| KR | 1020000063748 A | 11/2000 |
|---|---|---|
| KR | 100358847 B1 | 10/2002 |

(Continued)

*Primary Examiner* — Ali Alavi
(74) *Attorney, Agent, or Firm* — Innovation Counsel LLP

(57) ABSTRACT

A light guide panel, back light assembly and display apparatus are provided. According to an aspect of the inventive concept, there is provided the light guide panel which includes a top surface, a bottom surface, and four side surfaces, and one of the four side surfaces may be a light incident surface.

17 Claims, 19 Drawing Sheets

(56) References Cited

U.S. PATENT DOCUMENTS

| | | | | |
|---|---|---|---|---|
| 2014/0063414 A1* | 3/2014 | Kim | ................... | G02B 6/0036 349/65 |
| 2014/0125917 A1* | 5/2014 | Makuta | ............... | G02B 6/0011 349/62 |
| 2015/0226910 A1* | 8/2015 | Malinoski | ........ | B29D 11/00663 362/611 |

FOREIGN PATENT DOCUMENTS

| KR | 100800512 B1 | 1/2008 |
|---|---|---|
| KR | 1020080097294 A | 11/2008 |
| KR | 1020100005512 A | 1/2010 |
| KR | 100961290 B1 | 5/2010 |
| KR | 1020110090172 A | 8/2011 |
| KR | 1020130037314 A | 4/2013 |

\* cited by examiner

LIGHT GUIDE PANEL, BACK LIGHT ASSEMBLY AND DISPLAY APPARATUS EACH HAVING THE LIGHT GUIDE PANEL AND METHOD OF MANUFACTURING THE LIGHT GUIDE PANEL

This application claims priority to Korean Patent Application No. 10-2013-0116375 filed on Sep. 30, 2013 in the Korean Intellectual Property Office, the disclosure of which is incorporated herein by reference in its entirety.

BACKGROUND

1. Field of the Invention

Embodiments of the inventive concept relates to a light guide panel, a backlight assembly and a display device each having the light guide panel, and a method of manufacturing the light guide panel, and more particularly, to a light guide panel manufactured by extrusion, a backlight assembly and a display device each having the light guide panel, and a method of manufacturing the light guide panel.

2. Description of the Related Art

A liquid crystal display (LCD) includes a LCD module coupled to an exterior case. The LCD module includes a liquid crystal panel having two substrates and a liquid crystal layer interposed between the two substrates, and a backlight assembly disposed at the rear of the liquid crystal panel and applying light to the liquid crystal layer. The liquid crystal panel displays an image by adjusting the transmittance of light provided thereto by the backlight assembly.

The backlight assembly may be classified into a direct type or an edge type, depending on the position of a light source with respect to a display panel. In a direct-type backlight assembly, a light source is disposed at the rear of a display panel, whereas in an edge-type backlight assembly, a light source is disposed at one side of the rear of a display panel.

An edge-type backlight assembly needs a light guide panel for guiding light emitted by a light source toward a display panel. The light guide panel changes the path of light so as to guide the light toward the display panel.

In the meantime, the thickness of light guide panels has become one of the major challenges to keep up with current trends for the miniaturization of display devices. However, there is a clear limit in forming a thin light guide panel through injection molding, which is commonly used in the manufacture of a light guide panel.

SUMMARY

Aspects of the present invention provide light guide panel, backlight assembly and display apparatus each having the light guide panel and method of manufacturing the light guide panel. The above and other aspects of the inventive concept will become more apparent to one of ordinary skill in the art to which the inventive concept pertains by referencing the detailed description of the inventive concept given below.

According to an aspect of the present invention, there is provided a light guide panel including a top surface, a bottom surface configured to be opposite to the top surface, side surfaces connecting the top surface and the bottom surface, the side surfaces including a light incident surface and an opposite surface opposite to the light incident surface.

The bottom surface may include a flat reference surface and a plurality of diffusion patterns including a plurality of recesses recessed from the flat reference surface and a plurality of protrusions protruding from the flat reference surface and formed along at least parts of circumferences of the recesses. The plurality of protrusions may include first protrusions disposed in first regions with respect to a plurality of reference lines and second protrusions disposed in second regions with respect to the plurality of reference lines, the plurality of reference lines extending substantially perpendicular to the light incident surface, passing through centers of the plurality of recesses and dividing the plurality of recesses in half into the first regions and the second regions, and a volume of the second protrusions is equal to or less than half a volume of the first protrusions.

The top surface may include a first flat surface extending horizontally from an upper edge of the light incident surface, an inclined surface inclined downwardly from an edge of the first flat surface, and a second flat surface extending horizontally from a lower edge of the inclined surface.

The light guide panel may be formed of one or more selected from the group consisting of polycarbonate (PC) and polymethylmethacrylate (PMMA).

The light guide panel may have a thickness of about 100 to about 400 µm.

The light guide panel may be manufactured by extrusion molding method.

Residual stress may be substantially uniform throughout the entire light guide panel.

The light guide panel may have a melt mass flow rate (MFR) of about 20 to about 60 $cm^3/10$ min.

The light guide panel may have a tensile modulus of about 1800 to about 2200 Mpa.

The light guide panel may have a flexural strength of about 85 to about 95 Mpa.

A maximum height of the second protrusions may be equal to or less than half a maximum height of the first protrusions.

The light guide panel may further include third and fourth side surfaces perpendicular to the light incident surface and the opposite surface. The plurality of reference lines may extend in parallel with each other. The first regions may face toward the third side surface and the second regions may face toward the fourth side surface.

A height of the first protrusion may be increased according to an increase in distance from the reference line.

A volume of the second protrusions may be substantially zero.

According to another aspect of the present invention, there is provided a light guide panel manufactured by extrusion which includes a top surface, a bottom surface configured to be opposite to the top surface, side surfaces connecting the top surface and the bottom surface, the side surfaces including a light incident surface and an opposite surface opposite to the light incident surface.

The light guide panel may have a tensile modulus of about 1800 to about 2200 Mpa, a melt mass flow rate (MFR) of about 20 to about 60 $cm^3/10$ min, and a flexural strength of about 85 to about 95 Mpa.

According to another aspect of the present invention, there is provided a display device which includes a light guide panel, a backlight assembly configured to include a light source unit disposed on one side of the light guide panel and a reflective sheet disposed below the light guide panel, one or more optical sheets configured to be disposed over the backlight assembly, and a display panel configured to be disposed on the optical sheets.

The light guide panel comprises a top surface, a bottom surface opposite to the top surface and side surfaces connecting the top surface and the bottom surface, the side surfaces including a light incident surface and an opposite surface opposite to the light incident surface, The bottom surface may include a flat reference surface and a plurality of diffusion patterns including a plurality of recesses recessed from the flat reference surface and a plurality of protrusions protruding from the flat reference surface and formed along at least parts of circumferences of the recesses.

The plurality of protrusions may include first protrusions disposed in first regions with respect to a plurality of reference lines and second protrusions disposed in second regions with respect to the plurality of reference lines, the plurality of reference lines extending substantially perpendicular to the light incident surface, passing through centers of the plurality of recesses and dividing the plurality of recesses in half into the first regions and the second regions.

A volume of the second protrusions may be less than half a volume of the first protrusions.

The top surface may include a first flat surface extending horizontally from an upper edge of the light incident surface, an inclined surface inclined downwardly from an edge of the first flat surface, and a second flat surface extending horizontally from a lower edge of the inclined surface.

The light guide panel may have a thickness of about 100 to about 400 μm.

According to another aspect of the present invention, there is provided a display device which includes a method of manufacturing a light guide panel, the method includes forming a plurality of first flat portions, a plurality of second flat portions having a step difference with respect to the first flat portions, and a plurality of inclined portions connecting the first flat portions and the second flat portions on a light guide panel material by pressurizing the light guide panel material with a first roller with a plurality of recesses formed on the roller along a rolling direction, forming a light guide panel, having a first flat surface, a first inclined surface inclined downwardly from the first flat surface, and a second flat surface extending horizontally from a lower edge of the first inclined surface, by cutting the light guide panel material, and forming a plurality of diffusion patterns on a bottom surface of the light guide panel by passing through the light guide panel between a second roller with a pattern of a plurality of protrusions and a plurality of recesses formed on the second roller and a support roller disposed opposite to the second roller.

The bottom surface may include a flat reference surface and the diffusion patterns, and the diffusion patterns include a plurality of recesses recessed from the flat reference surface and the plurality of protrusions protruding from the flat reference surface and formed along at least parts of circumferences of the recesses.

The plurality of protrusions may include the first protrusions disposed in a first regions with respect to a plurality of reference lines and second protrusions disposed in second regions with respect to the plurality of reference lines and a volume of the second protrusions is equal to or less than half a volume of the first protrusions, the plurality of reference lines extending substantially perpendicular to the light incident surface, passing through centers of the plurality of recesses and dividing the plurality of recesses in half into the first regions and the second regions.

According to embodiments, it is possible to form a thin light guide panel.

In addition, it is possible to provide a thin backlight assembly and a thin display device each having a thin light guide panel.

Other features and aspects may be apparent from the following detailed description, the drawings, and the claims.

BRIEF DESCRIPTION OF THE DRAWINGS

The above and other aspects and features of the inventive concept will become more apparent with reference to detailed exemplary embodiments and accompanying drawings, in which.

DETAILED DESCRIPTION OF THE EMBODIMENTS

Figure 1:
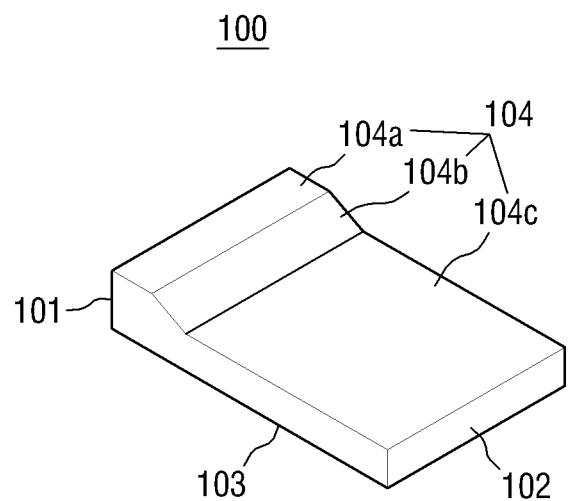
FIG. 1 is a perspective view illustrating a light guide panel according to an embodiment.

Advantages and features of the inventive concept and methods of accomplishing the same may be understood more readily with reference to the following detailed description of exemplary embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the invention to those skilled in the art, and the inventive concept will only be defined by the appended claims. Like reference numerals refer to like elements throughout the specification.

Figure 2:
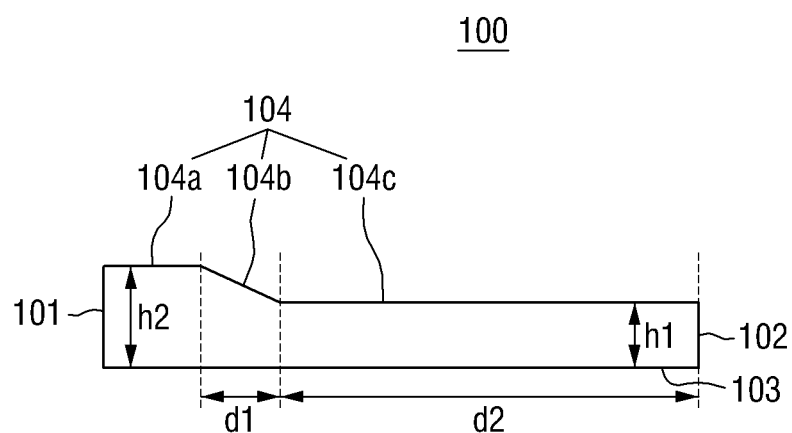
FIG. 2 is a cross-sectional view illustrating the light guide panel illustrated in FIG. 1.
Figure 3:
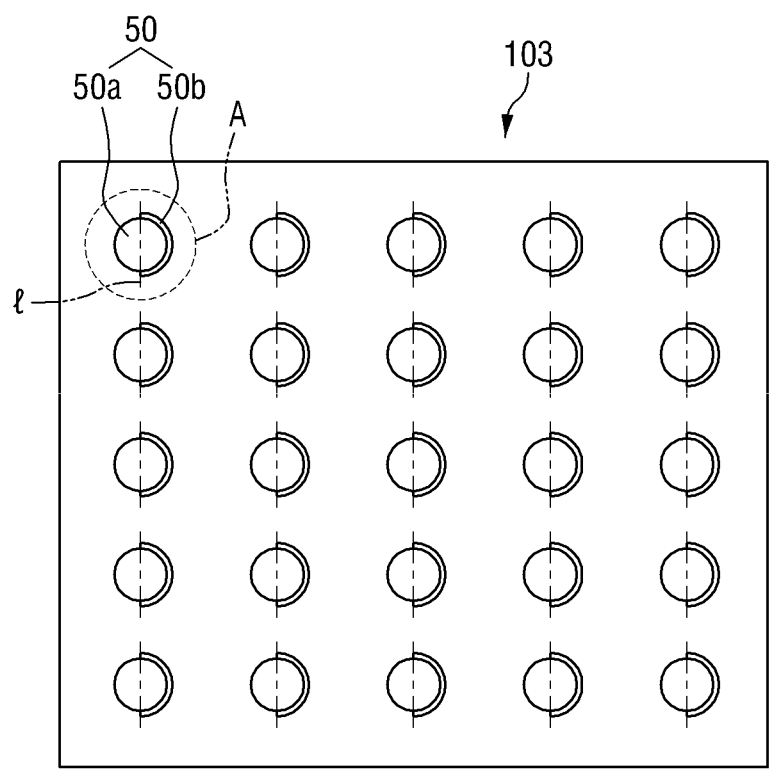
FIG. 3 is a bottom view illustrating the light guide panel illustrated in FIG. 1.
Figure 4:
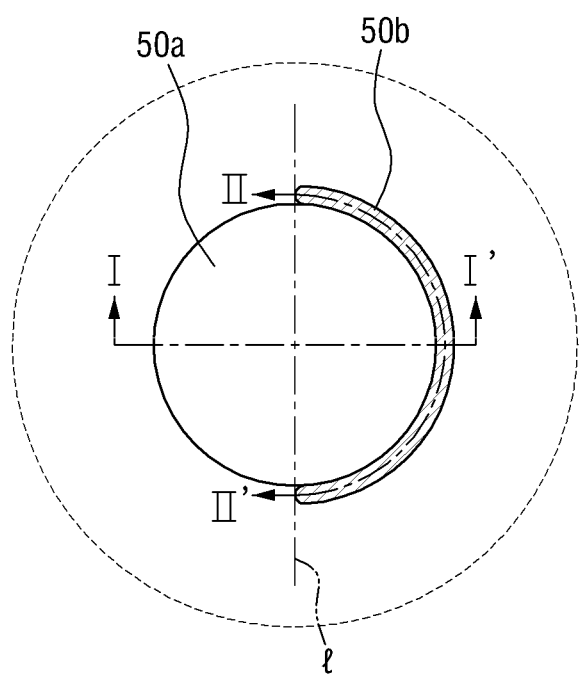
FIG. 4 is a partial enlarged view illustrating portion A of FIG. 3.

FIG. 1 is a perspective view illustrating a light guide panel 100 according to an embodiment, FIG. 2 is a cross-sectional view illustrating the light guide panel 100, FIG. 3 is a bottom view illustrating the light guide panel 100, and FIG. 4 is a partial enlarged view illustrating portion A of FIG. 3.

Referring to FIGS. 1 to 4, the light guide panel 100 may have a top surface 104, a bottom surface 103, and four side surfaces connecting the top surface 104 and the bottom surface 103. One of the four side surfaces may be a light incident surface 101. The side surface opposite to the light incident surface 101 will hereinafter be referred to as an opposite surface 102.

The light guide panel 100 may be formed of a transparent material. For example, the light guide panel 100 may be formed of polycarbonate (PC) or polymethylmethacrylate (PMMA). The light guide panel 100 may have flexibility. The flexibility of the light guide panel 100 may be determined by the thickness, shape and material of the light guide panel 100.

The bottom surface 103 of the light guide panel 100 is opposite to the top surface 104 of the light guide panel 100. The width of the bottom surface 103 may be substantially the same as that of the top surface 104.

The bottom surface 103 may include a flat reference surface and a plurality of diffusion patterns 50. The diffusion patterns 50 include a plurality of recesses 50a formed to be recessed from the reference surface and a plurality of protrusions 50b formed to protrude from the reference surface and disposed along at least parts of the circumferences of the recesses 50a.

The thickness of the light guide panel 100 at a side where the light incident is surface 101 is formed (hereinafter, the "light incident surface" side) may differ from the thickness of the light guide panel 100 at a side where the opposite surface 102 is formed (hereinafter, the "opposite surface" side). More specifically, the thickness of the light guide panel 100 can be reduced by forming the light guide panel 100 via extrusion, but the size of a light source unit (not illustrated) for applying light to the light incident surface 101 may not be reduced with the same speed as the reduction in thickness of the light guiding panel 100. Accordingly, to minimize the loss of light, the light guide panel 100 may be configured to have a relatively greater thickness at the light incident surface side than at the opposite surface side so as to be able to receive the light from the light source unit as much as possible. The top surface 104 may include a first flat surface 104 a, an inclined surface 104 b inclined downwardly from the first flat surface 104 a and having a length d1, and a second flat surface 104 c extending from the inclined surface 104 b and having a length d2.

The first flat surface 104a may extend in a parallel direction to the bottom surface from the upper edge of the light incident surface 101 at the light incident surface side. The inclined surface 104b may be inclined downwardly from the first flat surface 104a. The second flat surface 104c may extend from the lower edge of the inclined surface 104b to the opposite surface 102, which is disposed opposite to the light incident surface 101.

Due to the presence of the inclined surface 104b inclined downwardly from the first flat surface 104a, a height h2 of the light guide panel 100 at the light incident surface side, i.e., the height from the bottom surface 103 to the first flat surface 104a, may differ from a height h1 of the light guide panel 100 at the opposite surface side, i.e., the height from the bottom surface 103 to the second flat surface 104c. That is, in a case in which the first flat surface 104a horizontally extends from the upper edge of the light incident surface 101 and the second flat surface 104c extends to the upper edge of the opposite surface 102, the height h2 of the light guide panel 100 at the light incident surface side may be greater than the height h1 of the light guide panel 100 at the opposite surface side.

The light guide panel 100 may be manufactured by extrusion molding method. A method of manufacturing the light guide panel 100 via extrusion molding method will be described later in detail.

A light guide panel manufactured by extrusion molding method may have different physical properties from a light guide panel manufactured by injection molding method. That is, a light guide panel manufactured by extrusion molding nethod may differ from a light guide panel manufactured by injection molding method in terms of, for example, thickness, residual stress, melt mass flow rate (MFR), tensile modulus, and flexural strength.

More specifically, a light guide panel manufactured by extrusion molding method may have a thinner thickness than a light guide panel manufactured by injection molding method. For example, the light guide panel 100 manufactured by extrusion molding method may have, but is not limited, a thickness of about 100 µm to about 400 µm. Particularly, in a case in which the light guide panel 100 has the first flat surface 104a and the second flat surface 104c, the height from the bottom surface 103 to the first flat surface 104a may be about 340 µm to about 400 µm, and the height from the bottom surface 103 to the second flat surface 104c may be about 300 µm to about 340 µm. As mentioned above, the height from the bottom surface 103 to the first flat surface 104a may be greater than the height from the bottom surface 103 to the second flat surface 104c.

A light guide panel manufactured by extrusion molding method may have different residual stress properties from a light guide panel manufactured by injection molding method.

Residual stress may literally mean the stress remained in an object after the removal of any external force from the object. Even objects formed of the same material may have different residual stress properties depending on how they are manufactured. In a case in which the light guide panel 100 is manufactured by injection molding method, the material of the light guide panel 100 may flow with uniform directivity within a mold during injection molding. In this case, the light guide panel 100 may include a first location and a second location having a different residual stress levels from the first location. The first location may be an arbitrary location inside or on a surface of the light guide panel 100, and the second location may be an arbitrary location different from the first location.

On the contrary, the light guide panel 100 manufactured by the extrusion molding method may have substantially uniform residual stress irrelevant to the locations. That is, by measuring residual stress from a plurality of locations on the light guide panel 100, a determination may be made as to whether the light guide panel 100 has been manufactured by extrusion molding method or injection molding method. The measurement of residual stress may be performed by using a well-known method such as a destructive examination method (for example, an examination method involving cutting and drilling) or a non-destructive examination method (for example, an examination method using X-rays or ultrasound).

A light guide panel manufactured by extrusion molding method may have a different MFR from a light guide panel manufactured by injection molding method.

MFR is the speed of extrusion of a melt resin through a die having a predetermined length and diameter at a given temperature, load and piston position in the cylinder of an extrusion plastomer, and is measured as a volume of resin extruded for a predetermined amount of time. MFR may be measured by a well-known device such as an extrusion plastomer.

A light guide panel manufactured by extrusion may have a lower MFR than a light guide panel manufactured by injection molding. In a non-limiting example, in a case in which the light guide panel 100 is manufactured by extrusion molding method, the light guide panel 100 may have a MFR of about 20 to about 60 $cm^3$/10 min.

A light guide panel manufactured by extrusion molding method may have a different tensile modulus from a light guide panel manufactured by injection molding meyhod. Tensile modulus is the amount of deformation when pulled by either side of the object. The measurement of tensile modulus may be performed by a well-known tensile modulus testing device. A tensile testing device may determine tensile modulus by obtaining a stress-strain curve and calculating the slope of the stress-strain curve.

A light guide panel manufactured by extrusion molding method may have a relatively lower tensile modulus than a light guide panel manufactured by the injection molding method. In a non-limiting example, in a case in which the light guide panel 100 is manufactured by extrusion molding method, the light guide panel 100 may have a tensile modulus of about 1800 to about 2200 Mpa.

A light guide panel manufactured by extrusion molding method may have different flexural strength from a light guide panel manufactured by injection molding method. Flexural strength is the maximum stress that can be sustained by an object when the object is bent within an elastic range thereof. Flexural strength may be measured by a well-known testing device. For example, the flexural strength of an object may be measured by applying a load to the object in a lengthwise direction.

A light guide panel manufactured by extrusion molding method may have a relatively lower flexural strength than a light guide panel manufactured by injection molding method. In a non-limiting example, in a case in which the light guide panel 100 is manufactured by extrusion, the light guide panel 100 may have a flexural strength of about 85 to about 95 Mpa.

The diffusion patterns 50 may be formed on the bottom surface 103 of the light guide panel 103. The diffusion patterns 50 diffuse light incident upon the bottom surface 103 and thus guide the incident light toward the top surface 104 of the light guide panel 100. In a non-limiting example, the diffusion patterns 50 may be formed only on a part of the bottom surface 103 corresponding to the second flat surface 104c.

The diffusion patterns 50 are illustrated in FIG. 3 as, but are not limited to, being arranged in a matrix having a plurality of rows and a plurality of columns. The diffusion patterns 50 may be partially misaligned with one another in a row or column direction, or may be arranged irregularly. The diffusion patterns 50 are illustrated in FIG. 3 as, but are not limited to, having the same size. A pair of adjacent diffusion patterns 50 may have different sizes.

Figure 5:
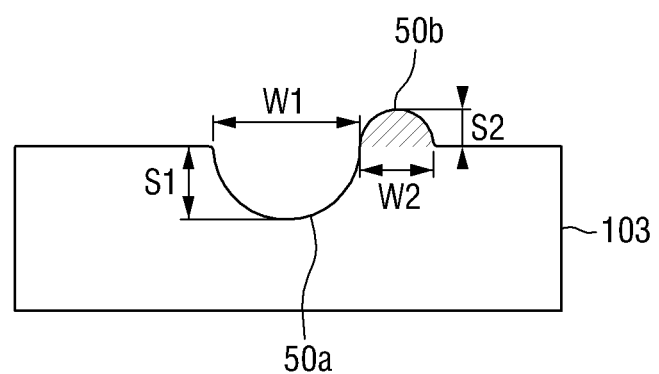
FIG. 5 is a cross-sectional view taken along line I-I' of FIG. 4.

The diffusion patterns 50 will hereinafter be described with reference to FIGS. 4 to 6. FIG. 5 is a cross-sectional view taken along line I-I' of FIG. 4, and FIG. 6 is a cross-sectional view taken along line II-II' of FIG. 4.

Figure 6:
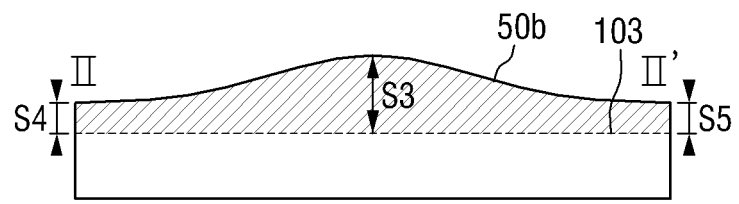
FIG. 6 is a cross-sectional view taken along line II-II' of FIG. 4.

Referring to FIGS. 4 to 6, the bottom surface 103 of the light guide panel 100 includes a recess 50a which is recessed from the flat reference surface of the bottom surface 103 and a protrusion 50b which protrudes from the reference surface and is formed along at least part of the circumference of the recess 50a.

A diffusion pattern 50 may include a recess 50a which is recessed from the flat reference surface toward the top surface 104 and a protrusion 50b which is formed along at least a part of the circumference of the recess 50a to protrude from the reference surface.

The recess 50a may be circular. For convenience, a reference line l may be defined. The reference line l may pass through the center of the recess 50a and divide the recess 50a in half. The left and right parts of the recess 50, separated by the reference line l, will hereinafter be referred to as first and second regions, respectively.

The protrusion 50b may be formed along part of the circumference of the recess 50a, and may protrude from the reference surface. For example, the protrusion 50b may be formed at least along the circumference of the recess 50a in the second region.

The protrusion 50b may be formed only along half the circumference of the recess 50a. The protrusion 50b may be formed to extend along half the circumference of the recess 50a. However, the protrusion may be formed along the circumference of the recess 50a in the first region. The protrusion formed in the first region may have smaller height than that of the protrusion formed in the second region.

The formation of the diffusion pattern 50 by extrusion will be described later in further detail.

The heights and widths of the recess 50a and the protrusion 50b will hereinafter be described with reference to FIG. 5. Referring to FIG. 5, a width w1 of the recess 50a may be relatively greater than a width w2 of the protrusion 50b. In a non-limiting example, the width w1 of the recess 50a may be about 40 to about 50 μm, and the width w2 of the protrusion 50b may be about 5 to about 10 μm.

A depth s1 of the recess 50a may be relatively greater than a height s2 of the protrusion 50b. The depth s1 of the recess 50a may correspond to the length from the bottom of the recess 50a to the reference surface, and the height s2 of the protrusion 50b may correspond to the length from the reference surface to the top of the protrusion 50b.

The height profile of the protrusion 50b will hereinafter be described with reference to FIG. 6. Referring to FIG. 6, the more distant from the reference line l, the greater the height of the protrusion 50b becomes. The height of the protrusion 50b may be increased according to an increase in distance from the reference line. That is, a height s3 of the protrusion 50b at a maximum displacement (i.e., at a most distant position) from the reference line 1 may be relatively greater than a height s4 or s5 of the protrusion 50b at either end thereof where the protrusion 50b adjoins the reference line 1. In a non-limiting example, the height s4 may be substantially the same as the height s5.

The arrangement of a plurality of diffusion patterns 50 will hereinafter be described with reference to FIG. 3. As described above, first and second regions may be defined by a reference line 1 dividing a recess 50a in half, and a protrusion 50b may be formed only in the second region. In a case in which a plurality of diffusion patterns 50 are formed, a plurality of reference lines 1 respectively passing through the centers of the diffusion patterns 50 and dividing the diffusion patterns 50 in half may be defined. The reference lines 1 may extend substantially in the same direction. That is, a reference line 1 passing through the center of a diffusion pattern 50 may be parallel to or extend in the same direction as a reference line 1 passing through the center of another diffusion pattern 50. For example, the reference lines may extend perpendicular to the light incident surface. The light guide panel 100 may include third and fourth side surfaces on either side of the top and bottom surfaces 104 and 103. The third and fourth side surfaces may be perpendicular to the light incident surface 101 and the opposite surface 102. A plurality of first regions on one side of their reference lines 1 may face toward the third side surface, and a plurality of second regions on the other side of their respective reference lines may face toward the fourth side surface. A plurality of protrusions 50b may be formed in the second regions. For example, as illustrated in FIG. 3, a plurality of protrusions 50b may be formed on the right side of the respective reference lines 1 by extrusion molding method, and the formation of the diffusion patterns 50 by extrusion molding method will be described later in further detail.

Light guide panels according to other embodiments will hereinafter be described. In the previous embodiment and the embodiments that follow, like reference numerals indicate like elements, and thus, descriptions thereof will be simplified, or even omitted.

Figure 7:
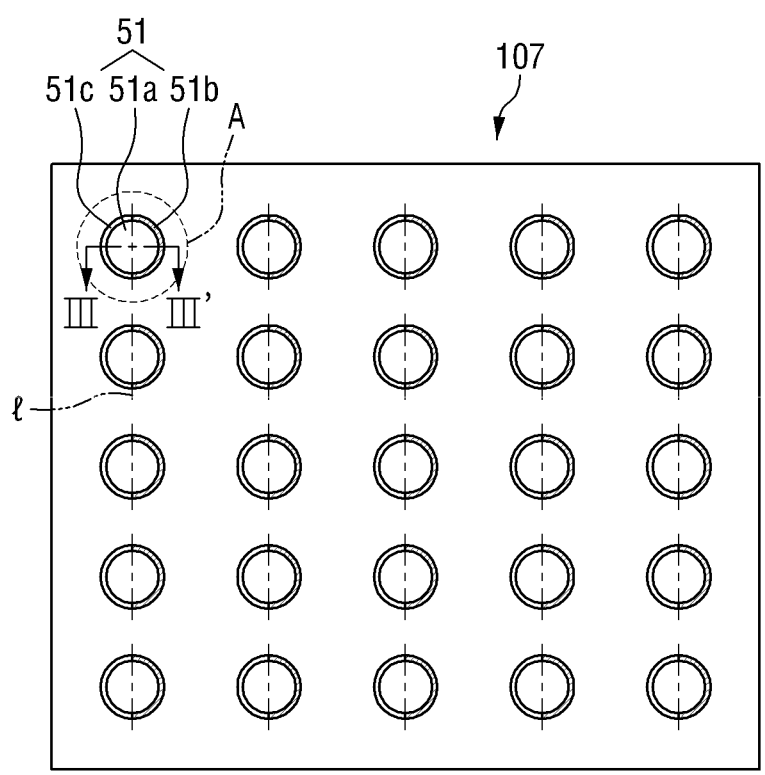
FIG. 7 is a bottom view illustrating a light guide panel according to another embodiment.
Figure 8:
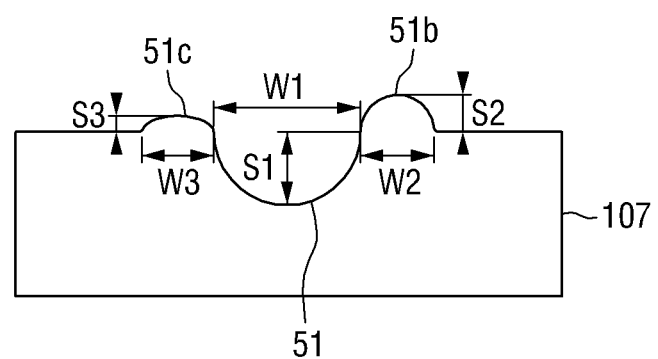
FIG. 8 is a cross-sectional view taken along line III-III' of FIG. 7.

FIG. 7 is a bottom view illustrating a light guide panel 107 according to another embodiment, and FIG. 8 is a cross-sectional view taken along line III-III' of FIG. 7.

Referring to FIGS. 7 and 8, the light guiding panel 107 may include a plurality of diffusion patterns 51. A plurality of reference lines 1 may be defined on the light guide panel 107, respectively passing through the centers of a plurality of recesses 51 a and dividing the recesses 51 a in half into a plurality of first regions and a plurality of second regions. The light guide panel 107 may include a plurality of protrusion units. The protrusion units may include a plurality of first protrusions 51 b formed in the second regions and a plurality of second protrusions 51 c formed in the first regions. The volume of the second protrusions 51 c may be equal to or less than half the volume of the first is protrusions 51 b.

The first protrusions 51b may be substantially the same as the protrusion(s) 50a described above with reference to FIGS. 4 and 5, and thus, detailed descriptions thereof will be omitted.

The second protrusions 51c may be formed in the first regions. The second protrusions 51c may differ from the first protrusions 51b. More specifically, the volume of the second protrusions 51c may be relatively smaller than the volume of the first protrusions 51b. In a non-limiting example, the volume of the second protrusions 51c may be less than half the volume of the first protrusions 51b. The volume of the second protrusions 51c may be zero, as already discussed with reference to FIG. 3. In another non-limiting example, the volume of the second protrusions 51c may be in the range of one fourth to one half of the volume of the first protrusions 51b.

A width w3 of the second protrusions 51c may be less than a width w1 of the recesses 51a. In a non-limiting example, the width w3 of the second protrusions 51c may be substantially the same as a width w2 of the first protrusions 51b. In another non-limiting example, the width w3 of the second protrusions 51c may be different from the width w2 of the first protrusions 51b.

A height s3 of the second protrusions 51c may be lower than a height s2 of the first protrusions 51b. The height of the first or second protrusions 51b or 51c may indicate the height from the reference surface on the light guide panel 107 to a point on the first or second protrusions 51b or 51c at a maximum displacement from the corresponding reference surface. In a non-limiting example, the height s3 of the second protrusions 51c may be equal to or less than half the height s3 of the first protrusions 51b. The height s3 of the second protrusions 51c may be zero, as already discussed with reference to FIG. 3. In another non-limiting example, the height s3 of the second protrusions 51c may be in the range of one fourth to one half of the height s2 of the first protrusions 51b.

Figure 9:
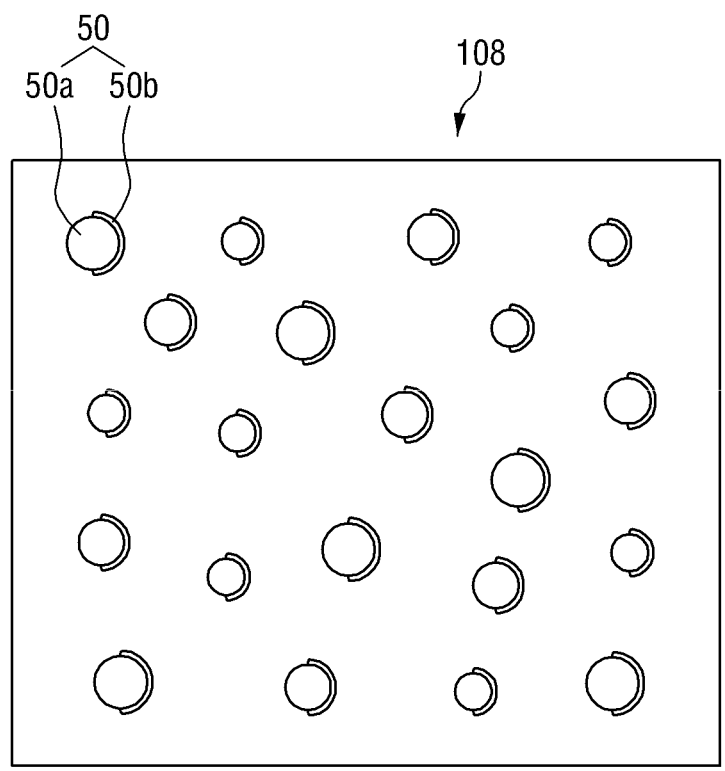
FIG. 9 is a bottom view illustrating a light guide panel according to another embodiment.

FIG. 9 is a bottom view illustrating a light guide panel 108 according to another embodiment. The light guide panel 108 differs from the light guide panel 103 of FIG. 3 in that it includes a plurality of diffusion patterns 50 arranged irregularly.

The diffusion patterns 50 may be irregularly arranged on the bottom surface of the light guide panel 108. A pair of adjacent diffusion patterns 50 may have different sizes from each other. That is, a pair of adjacent diffusion patterns 50 may have a different recess width from each other. However, even when the diffusion patterns 50 are arranged irregularly, a plurality of reference lines 1 that divide the diffusion patterns 50 into a plurality of first regions and a plurality of second regions may be aligned in the same direction or in parallel with one another. That is, the diffusion patterns 50 may be formed such that they may have a greater height in the second regions than that in the first regions.

Figure 10:
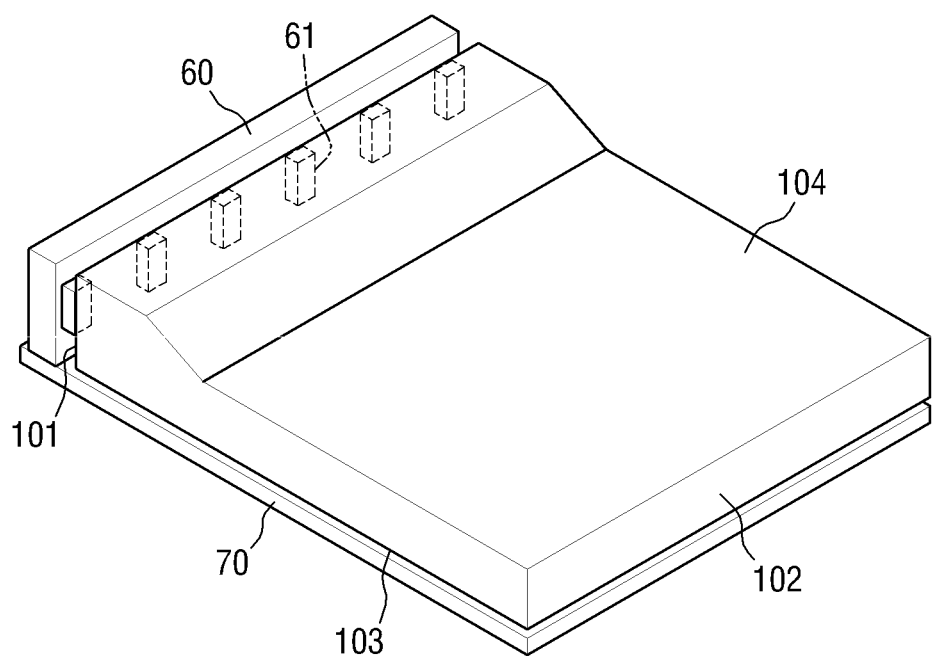
FIG. 10 is a perspective view illustrating a backlight assembly according to an embodiment.
Figure 11:
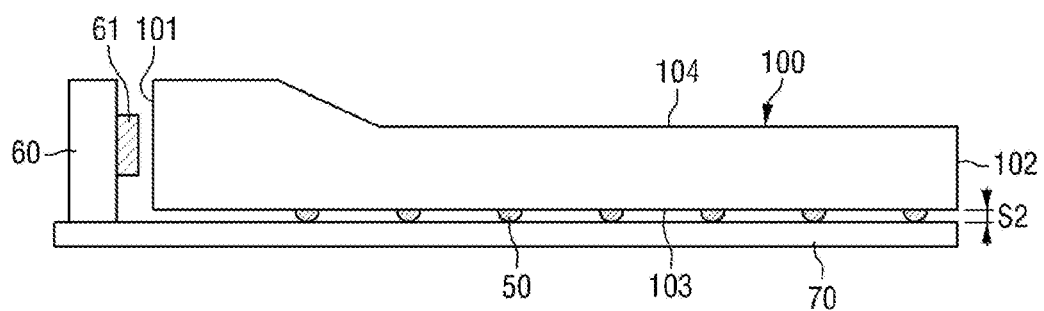
FIG. 11 is a cross-sectional view illustrating the backlight assembly illustrated in FIG. 10.

FIG. 10 is a perspective view illustrating a backlight assembly 1500 according to an embodiment, and FIG. 11 is a cross-sectional view illustrating the backlight assembly 1500.

Referring to FIGS. 10 and 11, the backlight assembly 1500 includes a light guide panel 100, a light source unit disposed on one side of the light guide panel 100, and a reflective sheet 70 disposed below the light guide panel 100. The light guide panel 100 includes a top surface 104, a bottom surface 103 opposite to the top surface 104, a light incident surface 101 on one side of the top surface 104 and the bottom surface 103, and an opposite surface 102 on the other side of the top surface 104 and the bottom surface 103. The bottom surface 103 includes a flat reference surface and a plurality of diffusion patterns 50. The diffusion patterns 50 include a plurality of recesses 50a recessed from the reference surface and a plurality of protrusions 50b protruding from the reference surface and formed along at least parts of the circumferences of the respective recesses 50a.

The light guide panel 100 may be substantially the same as any one of its counterparts in the previous embodiments, and thus, a detailed description thereof will be omitted.

The light source unit may be disposed on one side of the light guide panel 100. The light source unit may be disposed in the vicinity of or in contact with the light incident surface 101 of the light guide panel 100. The light source unit may include a body 60 and a plurality of light sources 61 disposed on the body 60. The light sources 61 may include, but are not limited to, one or more selected from the group consisting of light-emitting diodes (LEDs), cold cathode fluorescent lamps (CCFLs) and organic LEDs (OLEDs).

The reflective sheet 70 may be disposed below the light guide panel 100. The reflective sheet 70 may guide light toward the top surface 104 of the light guide panel 100 by reflecting light leaked from the bottom surface 103 of the light guide panel 100. That is, the reflective sheet 70 may reduce the loss of light by reflecting and thus guiding light that fails to be reflected from the bottom surface 103 of the light guide panel 100 toward the top surface 104 of the light guide panel 100.

The reflective sheet 70 may have, but is not limited to, a single-layer structure. The reflective sheet 70 may have a multi-layer structure including at least two layers.

The reflective sheet 70 may be formed of, for example, polyethylene terephthalate (PET) so as to have reflective properties. The reflective sheet 70 may have a surface coated with a diffusion layer that contains, for example, titanium dioxide.

The reflective sheet 70 may be disposed to at least partially overlap the bottom surface 103 of the light guide panel 100. In a non-limiting example, the reflective sheet 70 may be disposed to overlap a portion of the bottom surface 103 corresponding to a second flat surface 104c of the top surface 104.

The reflective sheet 70 may be placed in contact with the protrusions 50b of the diffusion patterns 50 on the bottom surface 103 of the light guide panel 100. Due to the presence of the protrusions 50b, the reflective sheet 70 may maintain uniform distance from the bottom surface 103 of the light guide panel 100. That is, the reflective sheet 70 may have uniform distance from the bottom surface 103 of the light guide panel 100 by an amount corresponding to a height s2 of the protrusions 50b.

Figure 12:
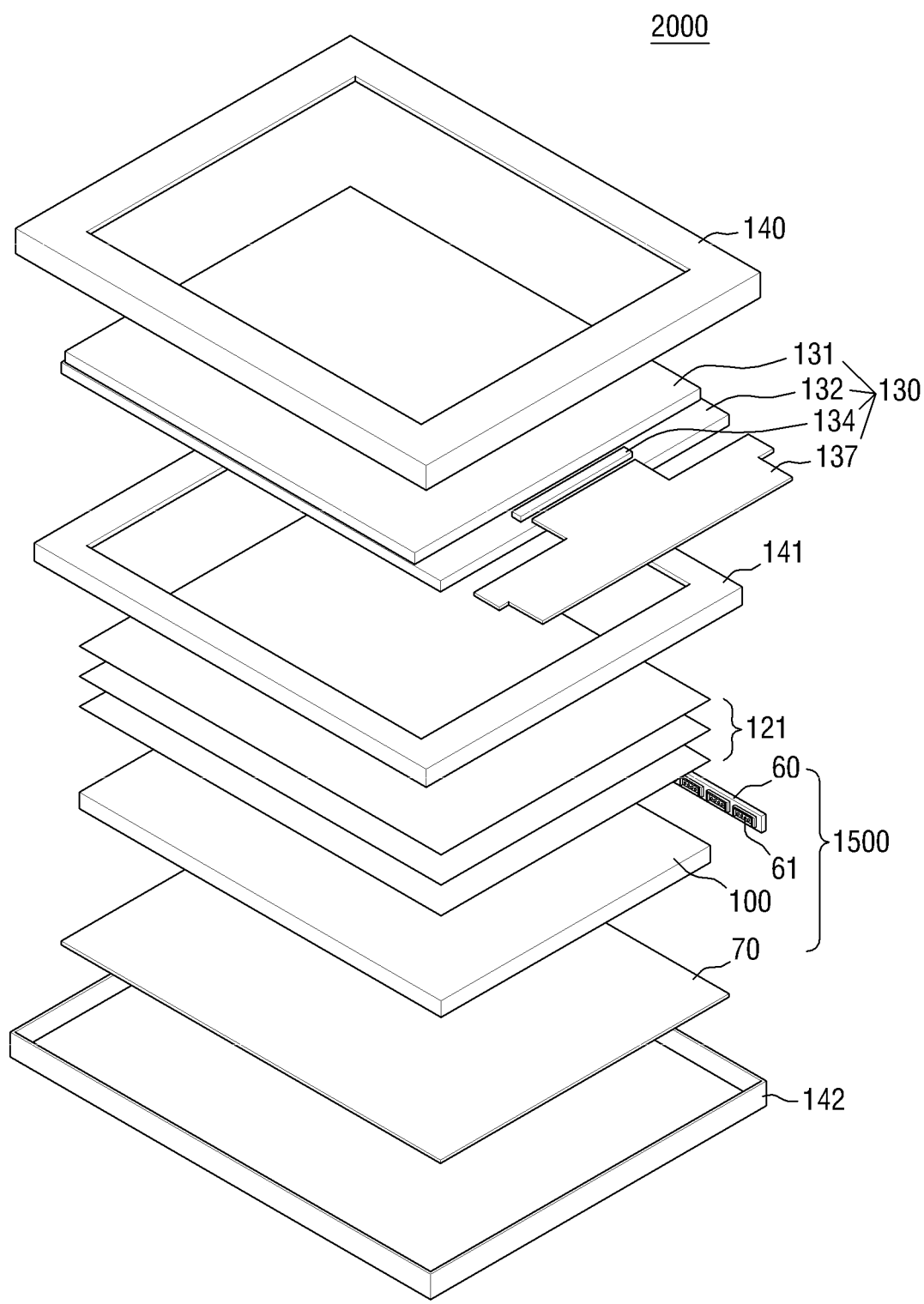
FIG. 12 is an exploded perspective view illustrating a display device according to an embodiment.

FIG. 12 is an exploded perspective view illustrating a display device 2000 according to an embodiment.

Referring to FIG. 12, the display device 2000 includes a backlight assembly 1500, one or more optical sheets 121 disposed over the backlight assembly 1500, and a display panel 130 disposed on the optical sheets 121. The backlight assembly 1500 includes a light guide panel 100, a light source unit 60 and 61 disposed on one side of the light guide panel 100, and a reflective sheet 70 disposed below the light guide panel 100. The light guide panel 100 includes a top surface 104, a bottom surface 103 opposite to the top surface 104, a light incident surface 101 on one side of the top surface 104 and the bottom surface 103, and an opposite surface 102 on the other side of the top surface 104 and the bottom surface 103. The bottom surface 103 includes a flat reference surface and a plurality of diffusion patterns 50. The diffusion patterns 50 include a plurality of recesses recessed from the reference surface and a plurality of protrusions 50b protruding from the reference surface and formed along at least parts of the circumferences of the respective recesses 50a.

The light guide panel 100 and the backlight assembly 1500 may be substantially the same as any one of its counterparts in the previous embodiments, and thus, a detailed description of the light guide panel 100 and the backlight assembly 1500 will be omitted. The display device 2000 may include a top chassis 140 and a bottom chassis 142.

The display panel 130 has a display region and a non-display region. The display panel 130 may include a first substrate 131, a second substrate 132 facing the first substrate 131, a liquid crystal layer (not illustrated), and a driving unit 134 and a flexible printed circuit board (FPCB) 137 attached to the first substrate 131.

The display region may be a region in which images are displayed, and the non-display region may be a region in which no images are displayed. In an example, the display region may be provided in the middle of the overlapping area of the first substrate 131 and the second substrate 132, and the non-display region may be located along the boundaries of the overlapping area of the first substrate 131 and the second substrate 132. In another example, the display region may correspond to a portion of the display panel 130 that is not overlapped by the top chassis 140, and the non-display region may correspond to a portion of the display panel 130 that is overlapped by the top chassis 140. The shape of the display region may be similar to the shape of the second substrate 132, and the area of the display region may be smaller than the area of the second substrate 132. The boundaries of the display region and the boundaries of the non-display region may be parallel to the sides of the second substrate 132. The boundaries between the display region and the non-display region may form a rectangle.

The first substrate 131 may at least partially overlap the second substrate 132. A central part of the overlapping area of the first substrate 131 and the second substrate 132 may correspond to the display region, and a boundary portion of the overlapping area of the first substrate 131 and the second substrate 132 may correspond to the non-display region. The driving unit 134 and the FPCB 137 may be attached to a portion of the display panel 130 where the first substrate 131 and the second substrate 132 do not overlap each other.

The second substrate 132 may be disposed opposite to the first substrate 131. The liquid crystal layer may be interposed between the first substrate 131 and the second substrate 132. A sealing member (not illustrated) such as a sealant may be disposed along the boundaries of the first substrate 131 and the second substrate 132 so that the first substrate 131 and the second substrate 132 may be bonded and sealed together.

The first substrate 131 and the second substrate 132 may both be rectangular. For convenience, the first substrate 131 and the second substrate 132 are both illustrated in FIG. 12 as being rectangular, but are not limited to a rectangular shape. That is, the first substrate 131 and the second substrate 132 may be formed in various shapes, other than the rectangular shape, according to the shape of the display panel 130.

The driving unit 134 may apply various signals (such as a driving signal) for driving an image in the display region. The FPCB 137 may output various signals to the driving unit 134.

The backlight assembly 1500 may be disposed below the display panel 130. The backlight assembly 1500 includes the light source unit emitting light and the light guide panel 100 guiding light emitted from the light source unit. The display device 200 may also include the reflective sheet 70, which is disposed below the light guide panel 100 and changes the path of light leaked from the light guide panel 100, the optical sheets 121, which is disposed over the light guide panel 100 and modulates the optical properties of light emitted from the light guide panel 100, and a mold frame 141 accommodating the reflective sheet 70 and the optical sheets 121 therein.

The mold frame 141 may support and fix the display panel 130 and contact with the boundaries of the bottom surface of the display panel 130. A boundary portion on the bottom surface of the display panel 130 may correspond to the non-display region. The mold frame 141 may at least partially overlap the non-display region of the display panel 130.

The top chassis 140 may cover the boundaries of the display panel 130 and the sides of the display panel 130 and the light source unit. The bottom chassis 142 may accommodate the optical sheets 121, the light guide panel, the backlight assembly 1500, and the reflective sheet 70 therein. The top chassis 140 and the bottom chassis 142 may both be formed of a conductive material, for example, a metal.

A method of manufacturing a light guide panel, according to an embodiment will hereinafter be described with reference to FIGS. 13 to 19.

Referring to FIGS. 13 to 19, the method includes: pressurizing a light guide panel material 1000 with a first roller 950 having a plurality of recesses 951 formed thereon along a rolling direction thereof so as to form a plurality of flat surfaces and a plurality of inclined surfaces on the light guide panel material 1000; cutting the light guide panel material 1000 into a plurality of light guide panels 100; and forming a plurality of diffusion patterns 50 on a bottom surface 103 of each of the light guide panels 100 by passing through each of the light guide panels 100 between a second roller 400 with a pattern of a plurality of protrusions formed thereon and a second support roller 300 disposed opposite to the second roller 400.

The light guide panel material 1000 may be passed through between the first roller 950 having the recesses 951 formed thereon along the rolling direction thereof and a first support roller 980 disposed opposite to the first roller 950. The pressurization of the light guide panel material 1000 with the first roller 950 will hereinafter be described in detail with reference to FIG. 13.

Figure 13:
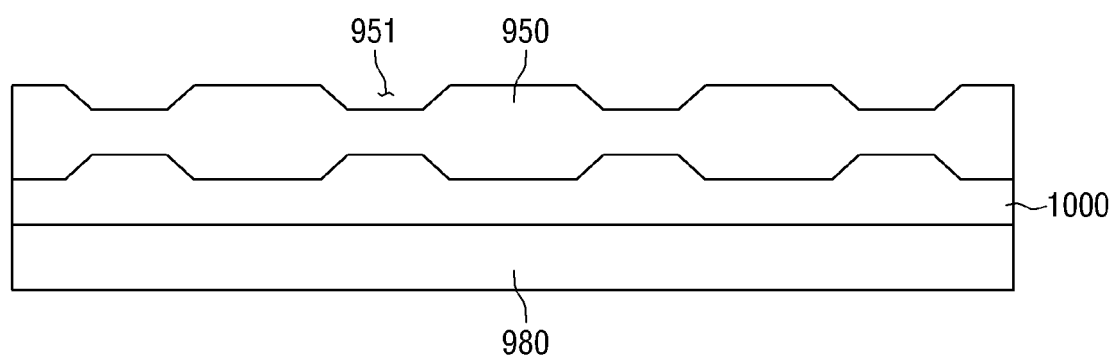
FIG. 13 is a cross-sectional view illustrating the pressurization of a light guide panel material by a first roller with a plurality of recesses formed thereon, as performed in a method of manufacturing a light guide panel, according to an embodiment.

FIG. 13 is a cross-sectional view illustrating the pressurization of the light guide panel material 1000 by the first roller 950 with the recesses 951 formed thereon and the first support roller 980, as performed in the method of manufacturing a light guide panel according to an embodiment. Referring to FIG. 13, the recesses 951 may be formed along the rolling direction of the first roller 950. The recesses 951 may be formed to a predetermined depth from the surface of the first roller 950. The recesses 951 may have an inversely tapered shape. That is, the recesses 951 may have an inverse trapezoidal cross-sectional shape. By pressurizing the light guide panel material 100 with the first roller 950, a plurality of protrusions that conform to the shape of the recesses 951 may be formed on the light guide panel 1000. That is, a plurality of protrusions having a trapezoidal shape may be formed on the light guide panel material 100 so as to correspond to the recesses 951, respectively, having an inverse trapezoidal shape. A plurality of flat portions and a plurality of inclined portions may be formed on the top surface of the light guide panel material 1000. More specifically, a plurality of first flat portions, a plurality of second flat surfaces having a step difference with respect to the first flat portions, and a plurality of inclined portions connecting the first flat portions and the second flat portions may be formed on the top surface of the light guide panel material 1000.

The light guide panel material 1000 may be cut into a plurality of light guide panels 100. The formation of the light guide panels 100 will hereinafter be described in detail with reference to FIG. 14.

Figure 14:
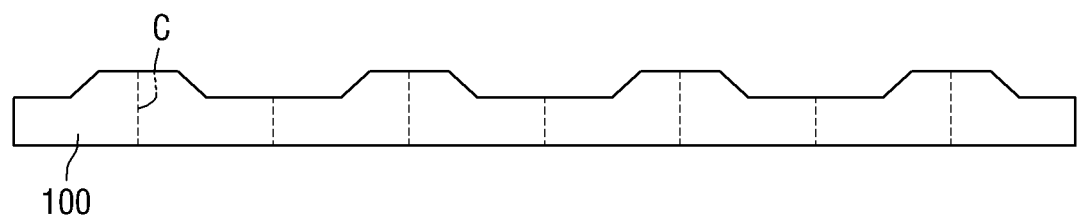
FIG. 14 is a cross-sectional view illustrating a light guide panel material having a plurality of flat portions and a plurality of inclined portions, as used in the method of manufacturing a light guide panel, according to an embodiment.

FIG. 14 is a cross-sectional view illustrating the light guide panel material 1000 having a plurality of flat portions and a plurality of inclined portions, as used in the method of manufacturing a light guide panel, according to an embodiment.

Referring to FIG. 14, a plurality of light guide panels 100 may be formed by cutting the light guide panel material 1000. More specifically, the light guide panel material 1000 may be appropriately cut such that a plurality of light guide panels 100 each having a first flat surface 104a, a first inclined surface 104b inclined downwardly from the first flat surface 104a and a second flat surface 104c extending from the first inclined surface 104b may be obtained. For example, the light guide panel material 1000 may be cut along a plurality of cutting lines C, as illustrated in FIG. 14. There is no restriction on how to cut the light guide panel material 1000. That is, the light guide panel material 1000 may be cut using various methods, and the present inventive concept is not limited by how to cut the light guide panel material 1000.

Each of the light guide panels 100 obtained by cutting the light guide panel material 1000 may be passed through between the second roller 400 having a pattern of a plurality of protrusions 601 and a plurality of recesses 602 formed on the surface thereof and the second support roller 300 disposed opposite to the second roller 400, thereby forming a plurality of diffusion patterns on the bottom surface 103 of each of the light guide panels 100.

More specifically, the formation of the diffusion patterns 50 on the bottom surface 103 of each of the light guide panels 100 includes: forming a plurality of recesses 501 on a first plate 500 and forming a plurality of protrusions 502 along the circumferences of the recesses 501; transferring a pattern of the recesses 501 and the protrusions 502 on the first plate 500 onto a second plate 600 such that a pattern of a plurality of protrusions 601 corresponding to the recesses 501 and a plurality of recesses 602 corresponding to the protrusions 502 may be formed on the second plate 600; and forming the diffusion patterns 50 on the bottom surface 103 of each of the light guide panels 100 by passing through each of the light guide panels 100 between the second roller 400 with the second plate 600 attached thereon and the second support roller 300 disposed opposite to the second roller 400.

The recesses 501 and the protrusions 502 may be formed on the first plate 500. The formation of the recesses 501 and the protrusions 502 on the first plate 500 will hereinafter be described in detail with reference to FIGS. 15 and 16.

Figure 15:
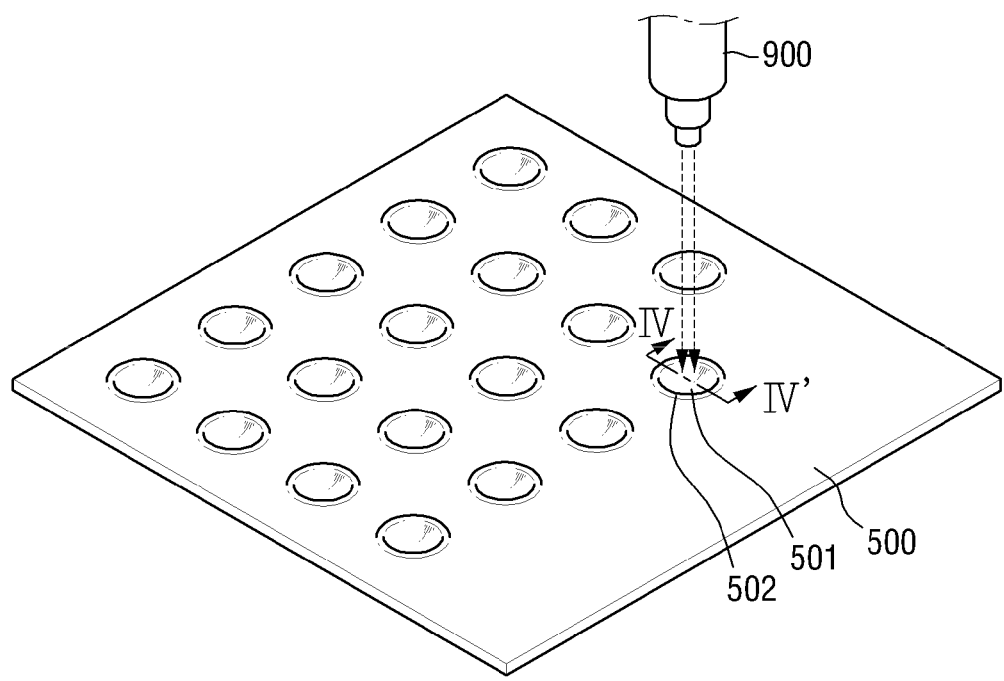
FIG. 15 is a plan view illustrating the formation of a pattern of a plurality of recesses and a plurality of protrusions on a first plate, as performed in the method of manufacturing a light guide panel, according to an embodiment.
Figure 16:
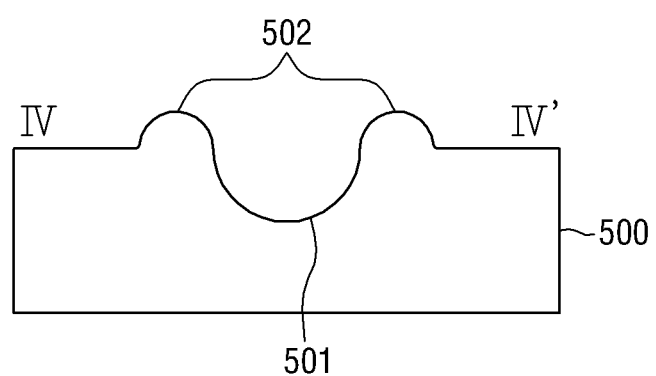
FIG. 16 is a cross-sectional view taken along line IV-IV' of FIG. 15.

FIG. 15 is a plan view illustrating the formation of the pattern of the recesses 501 and the protrusions 502 on the first plate 500, as performed in the method of manufacturing a light guide panel, according to an embodiment, and FIG. 16 is a cross-sectional view taken along line IV-IV' of FIG. 15.

Referring to FIGS. 15 and 16, the recesses 501 and the protrusions 502 may be formed on the first plate 500 by applying laser light onto the first plate 500 with a laser device 900.

The first plate 500 may be formed as a flat panel. The first plate 500 may be formed of a rigid material, but may have flexibility due to its small thickness. In a non-limiting example, the first plate 500 may be formed of a steel use stainless (SUS) material.

The recesses 501 and the protrusions 502 may be formed by applying laser light onto the first plate 500 with the laser device 900. By applying laser onto the first plate 500, the recesses 501 may be formed to have a predetermined depth from the surface of the first plate 500, and the protrusions 502 may be formed along the circumferences of the recesses 501. The protrusions 502 may be burrs obtained during the formation of the recesses 501 with the laser device 900. That is, the protrusions 502 may be raised edges of the recesses 501.

The maximum depth of the recesses 501 may be relatively greater than the maximum height of the protrusions 502, and the width of the recesses 501 may be relatively greater than the width of the protrusions 502.

The pattern on the first plate 500 may be transferred onto the second plate 600, thereby forming the protrusions 601 corresponding to the recesses 501 and the recesses 602 corresponding to the protrusions 502 on the second plate 600. The formation of the protrusions 601 and the recesses 602 on the second plate 600 will hereinafter be described in detail with reference to FIGS. 17 and 18.

Figure 17:
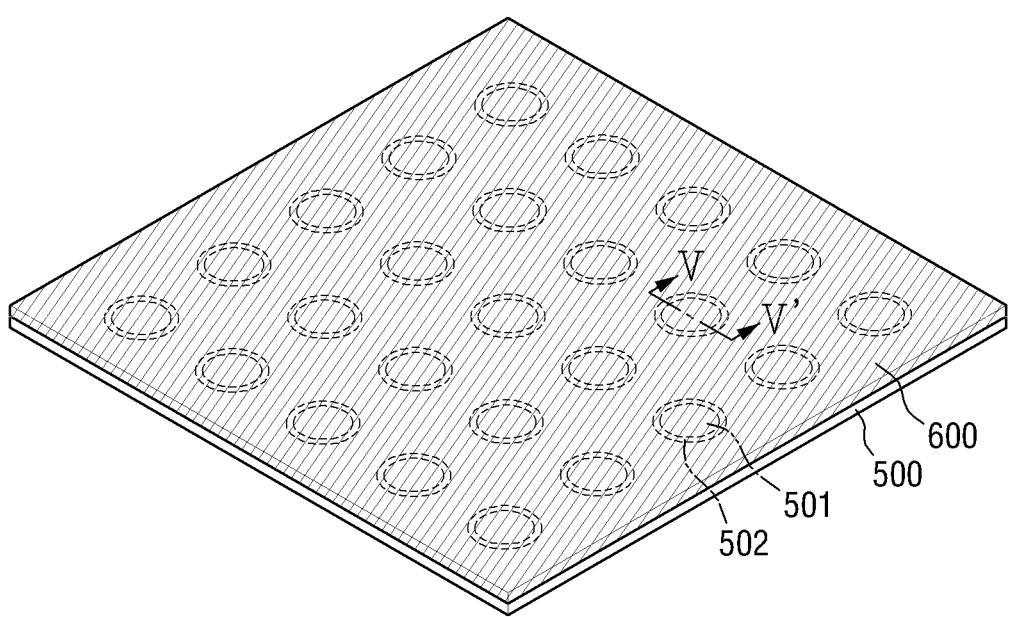
FIG. 17 is a perspective view illustrating the transfer of the pattern of the recesses and the protrusions on the first plate to a second plate so as to form a plurality of protrusions corresponding to the recesses of the first plate and a plurality of recesses corresponding to the protrusions of the first plate on the second plate, as performed in the method of manufacturing a light guide panel, according to an embodiment.
Figure 18:
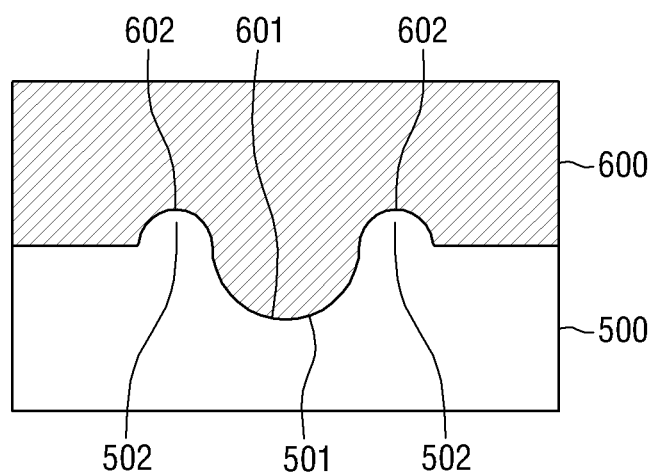
FIG. 18 is a cross-sectional view taken along line V-V' of FIG. 17.

FIG. 17 is a perspective view illustrating the transfer of the pattern of the recesses 501 and the protrusions 502 on the first plate 500 to the second plate 600 so as to form the protrusions 601 and the recesses 602 on the second plate 600, as performed in the method of manufacturing a light guide panel, according to an embodiment, and FIG. 18 is a cross-sectional view taken along line V-V' of FIG. 17.

Referring to FIGS. 17 and 18, the pattern on the first plate 500 may be transferred to the second plate 600. The second plate 600 may be formed as a flat panel. The second plate 600 may be formed of, but is not limited to, a metal material. The second plate 600 may have flexibility due to its small thickness. In a non-limiting example, the second plate 600 may be formed by nickel (Ni) electroforming.

By transferring the pattern on the first plate 500 to the second plate 600, the protrusions 601 and the recesses 602 corresponding to the recesses 501 and the protrusions 502, respectively, of the first plate 500 may be formed on the second plate 600. The protrusions 601 may be formed on the second plate 600 so as to correspond to the recesses 501 of the first plate 500, and the recesses 602 may be formed on the second plate 600 so as to correspond to the protrusions 502 of the first plate 500. That is, the protrusions 601 may substantially conform to the shape of the recesses 501, and the recesses 602 may substantially conform to the shape of the protrusions 502. Accordingly, the pattern of the protrusions 601 and the recesses 602 on the second plate 600 may be the reverse of the pattern of the recesses 501 and the protrusions 502 on the first plate 500. Therefore, the height of the protrusions 601 may be relatively greater than the depth of the recesses 602, and the width of the protrusions 601 may be relatively greater than the width of the recesses 602.

The diffusion patterns 50 may be formed on the bottom surface 103 of each of the light guide panels 100 by passing through each of the light guide panels 100 between the second roller 400 with the second plate 600 included on the surface thereof and the second support roller 300 disposed opposite to the second roller 400. As mentioned above, the second plate 600 may be a thin panel with flexibility. The second roller 400 includes a cylindrical central portion and the second plate 600 surrounding the central portion. The second plate 600 may be attached onto the central portion so as to cover the surface of the central portion. The surface area of the central portion may be the same as the area of the second plate 600, but the present inventive concept is not restricted to this. That is, the surface area of the central portion may be greater than the area of the second plate 600. The formation of the diffusion patterns 50 on each of the light guide panels 100 by passing through each of the light guide panels 100 between the second roller 400 and the second support roller 300 will hereinafter be described in detail with reference to FIG. 19.

Figure 19:
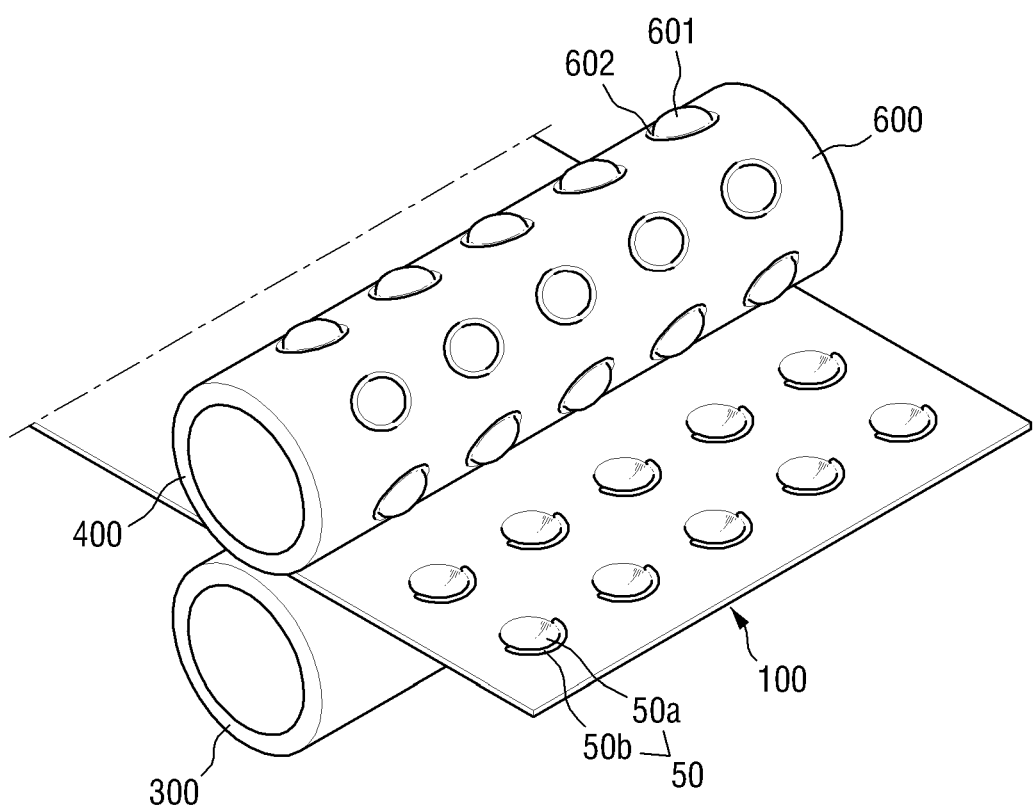
FIG. 19 is a perspective view illustrating the formation of a plurality of diffusion patterns on the bottom of a light guide panel by passing the light guide panel through between a second roller with the second plate attached thereon and a second support roller disposed opposite to the second roller, as performed in the method of manufacturing a light guide panel, according to an embodiment.

FIG. 19 is a perspective view illustrating the formation of the diffusion patterns 50 on the bottom of a light guide panel 100 by passing the light guide panel 100 through between the second roller 400 with the second plate 600 attached thereon and the second support roller 300 disposed opposite to the second roller 400, as performed in the method of manufacturing a light guide panel, according to an embodiment.

Referring to FIG. 19, the diffusion patterns 50 may be formed on the light guide panel 100 by passing through the light guide panel 100 between the second roller 400 with the second plate 600 attached thereon and the second support roller 300 disposed opposite to the second roller 400.

By inserting the light guide panel 100 between the second roller 400 and the second support roller 300, a plurality of diffusion patterns 50 may be formed on the bottom surface 103 of the light guide panel 100. More specifically, the light guide panel 100 may be inserted between the second roller 400 and the second support roller 300 in such a manner that the top surface 104 and the bottom surface 103 of the light guide panel 100 may be placed in contact with the second support roller 300 and the second roller 400, respectively. The second roller 400 and the second support roller 300 rotate in opposite directions, thereby moving the light guide panel 100 in a first direction. The diffusion patterns 50 may be formed on the bottom surface 103 of the light guide panel 100 so as to correspond to the protrusions 601 and the recesses 602 of the second plate 600.

The diffusion patterns 50 may be substantially the same as their counterparts in the previous embodiments. A plurality of reference lines 1 may be defined, respectively passing through the centers of the recesses 50a of the diffusion patterns 50 and dividing the diffusion patterns 50 in half into a plurality of first regions and a plurality of second regions. In a non-limiting example, the second roller 400 and the second support roller 300 may be rotated in opposite directions, respectively, to move the light guide panel 100 in a first direction. The reference lines may extend perpendicularly to the first direction. The second regions where the protrusions 50b having a greater height are formed may be farther from the second roller 400 than the first regions having a smaller height.

During the formation of the diffusion patterns 50, the protrusions 50b having a greater height may be automatically formed in the second regions, rather than in the first regions. The formation of the diffusion patterns 50 will hereinafter be described in further detail.

In response to a rotation of the second roller 400 and second supporting roller 300, the light guide panel 100 may proceed in the first direction. When the first light guide panel 100 is passed through between the second roller 400 and the second support roller 300, the diffusion patterns 50 may be formed on the bottom surface 103 of the light guide panel 100.

The light guide panel 100 may contact with the pattern on the second roller 400 in the order of a first part of recesses 602 farther from the second roller 400, protrusions 601, and a second part of recesses 602 close to the second roller 400, and thereby the second regions of protrusion where the protrusions 50b having a greater height than the first part of recesses 602, the recesses 50*a* and the first regions of protrusion are formed in the light guide panel 100 in turn, When the light guide panel 100 contacts with the second part of recesses 602, the pressure applied to the light guide panel 100 by the second part of recesses 602 may be lower than the pressure applied to the light guide panel 100 by the first part of recesses 601 due to the presence of the protrusions 601. Accordingly, the second part of recesses 602 may not press down the light guide panel 100 at all, or may press down the light guide panel 100 with a relatively lower pressure than the pressure that the first part of recesses 602 press down the light guide panel 100. As a result, no protrusions may be formed in the first regions at all, or protrusions having a smaller height than that of the first region (i.e., the second protrusions 51*c*) may be formed in the first regions. The first protrusions and the second protrusions are substantially the same as their respective counterparts in the previous embodiments, and thus, detailed descriptions thereof will be omitted.

While the inventive concept has been particularly shown and described with reference to exemplary embodiments thereof, it will be understood by those of ordinary skill in the art that various changes in form and detail may be made therein without departing from the spirit and scope of the inventive concept as defined by the following claims. The exemplary embodiments should be considered in a descriptive sense only and not be considered for purposes of limitation.

What is claimed is:

1. A light guide panel, comprising:
a top surface;
a bottom surface configured to be opposite to the top surface and facing a reflective sheet;
side surfaces connecting the top surface and the bottom surface, the side surfaces including a light incident surface and
an opposite surface opposite to the light incident surface, wherein:
the bottom surface comprises a flat reference surface and a plurality of diffusion patterns including a plurality of recesses recessed from the flat reference surface and a plurality of protrusions protruding from the flat reference surface and formed along at least parts of circumferences of the recesses;
each of the plurality of protrusions includes a first protrusion disposed in a first region with respect to a reference line and a second protrusion disposed in a second region with respect to the reference line, the reference line extending substantially perpendicular to the light incident surface, passing through each of centers of the plurality of recesses and dividing each of the plurality of recesses in half into the first region and the second region; and
each of a volume of the second protrusions is less than half each of a volume of the first protrusions, and
wherein each of the first regions is disposed at the same one side with respect to the reference line.

2. The light guide panel of claim 1, wherein the top surface comprises a first flat surface extending horizontally from an upper edge of the light incident surface, an inclined surface inclined downwardly from an edge of the first flat surface, and a second flat surface extending horizontally from a lower edge of the inclined surface.

3. The light guide panel of claim 1, wherein the light guide panel is formed of one or more selected from the group consisting of polycarbonate (PC) and polymethylmethacrylate (PMMA).

4. The light guide panel of claim 1, wherein the light guide panel has a thickness of about 100 to about 400 μm.

5. The light guide panel of claim 1, wherein the light guide panel is manufactured by extrusion molding method.

6. The light guide panel of claim 1, wherein residual stress is substantially uniform throughout the entire light guide panel.

7. The light guide panel of claim 1, wherein the light guide panel has a melt mass flow rate (MFR) of about 20 to about 60 cm$^3$/10 min.

8. The light guide panel of claim 1, wherein the light guide panel has a tensile modulus of about 1800 to about 2200 Mpa.

9. The light guide panel of claim 1, wherein the light guide panel has a flexural strength of about 85 to about 95 Mpa.

10. The light guide panel of claim 1, wherein a maximum height of the second protrusions is equal to or less than half a maximum height of the first protrusions.

11. The light guide panel of claim 1, further comprising:
third and fourth side surfaces perpendicular to the light incident surface and the opposite surface,
wherein the plurality of reference lines extend in parallel with each other, the first regions face toward the third side surface and the second regions face toward the fourth side surface.

12. The light guide panel of claim 1, wherein a height of the first protrusion is increased according to an increase in distance from the reference line.

13. The light guide panel of claim 1, wherein a volume of the second protrusions is substantially zero.

14. A light guide panel manufactured by extrusion, comprising:
a top surface;
a bottom surface configured to be opposite to the top surface;
side surfaces connecting the top surface and the bottom surface, the side surfaces including a light incident surface and an opposite surface opposite to the light incident surface,
wherein the light guide panel has a tensile modulus of 1800 Mpa to 2200 Mpa, a melt mass flow rate (MFR) of 20 cm$^3$/10 min to 60 cm$^3$/10 min, and a flexural strength of 85 Mpa to 95 Mpa.

15. A liquid crystal display, comprising:
a light guide panel;
a backlight assembly configured to include a light source unit disposed on one side of the light guide panel and a reflective sheet disposed below the light guide panel;
one or more optical sheets configured to be disposed over the backlight assembly; and
a display panel configured to be disposed on the optical sheets,
wherein the light guide panel comprises a top surface, a bottom surface opposite to the top surface and facing a reflective sheet, and side surfaces connecting the top surface and the bottom surface, the side surfaces including a light incident surface and an opposite surface opposite to the light incident surface,
wherein:
the bottom surface comprises a flat reference surface and a plurality of diffusion patterns including a plurality of recesses recessed from the flat reference surface and a plurality of protrusions protruding from the flat reference surface and formed along at least parts of circumferences of the recesses;

the plurality of protrusions include first protrusions disposed in first regions with respect to a plurality of reference lines and second protrusions disposed in second regions with respect to the plurality of reference lines, the plurality of reference lines extending substantially perpendicular to the light incident surface, passing through centers of the plurality of recesses and dividing the plurality of recesses in half into the first regions and the second regions; and a volume of the second protrusions is less than half a volume of the first protrusions.

16. The display device of claim 15, wherein the top surface comprises a first flat surface extending horizontally from an upper edge of the light incident surface, an inclined surface inclined downwardly from an edge of the first flat surface, and a second flat surface extending horizontally from a lower edge of the inclined surface.

17. The display device of claim 16, wherein the light guide panel has a thickness of about 100 to about 400 μm.

* * * * *